US011251957B2

(12) United States Patent
Guajardo Merchan et al.

(10) Patent No.: US 11,251,957 B2
(45) Date of Patent: Feb. 15, 2022

(54) SYSTEM AND METHOD FOR DELEGATING TICKET AUTHENTICATION TO A STAR NETWORK IN THE INTERNET OF THINGS AND SERVICES

(71) Applicant: Robert Bosch GmbH, Stuttgart (DE)

(72) Inventors: Jorge Guajardo Merchan, Pittsburgh, PA (US); Paulius Duplys, Markgroeningen (DE); Rene Guillaume, Boeblingen (DE); Jeffrey Donne, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 324 days.

(21) Appl. No.: 16/313,221

(22) PCT Filed: Jun. 28, 2017

(86) PCT No.: PCT/EP2017/065950
§ 371 (c)(1),
(2) Date: Dec. 26, 2018

(87) PCT Pub. No.: WO2018/002111
PCT Pub. Date: Jan. 4, 2018

(65) Prior Publication Data
US 2019/0229916 A1 Jul. 25, 2019

Related U.S. Application Data

(60) Provisional application No. 62/355,468, filed on Jun. 28, 2016.

(51) Int. Cl.
*H04L 9/32* (2006.01)
*H04W 4/70* (2018.01)
(Continued)

(52) U.S. Cl.
CPC .......... *H04L 9/3213* (2013.01); *H04L 9/0841* (2013.01); *H04L 12/44* (2013.01);
(Continued)

(58) Field of Classification Search
CPC ... H04L 9/3213; H04L 12/44; H04L 2209/72; H04L 2209/805; H04L 63/08;
(Continued)

(56) References Cited

U.S. PATENT DOCUMENTS 8,789,208 B1 * 7/2014 Sundaram ............... G06F 3/065
726/29
2007/0254630 A1 * 11/2007 Moloney ............. H04L 63/0823
455/410

(Continued)

FOREIGN PATENT DOCUMENTS

CN 101984625 A 3/2011
WO 2015/100616 A1 7/2015

OTHER PUBLICATIONS

International Search Report corresponding to PCT Application No. PCT/EP2017/065950, dated Aug. 7, 2017 (English language document) (4 pages).

(Continued)

*Primary Examiner* — Gary S Gracia
(74) *Attorney, Agent, or Firm* — Maginot, Moore & Beck LLP

(57) ABSTRACT

A star topology network comprises a user device, a central gateway, and one or more sensor nodes added to the existing network. A communication between the user device and the central gateway is secured either based on public-key cryptography, symmetric-key cryptography, or by the use of a secure channel such as a wired communication. A request from the user device to the central gateway can be transmitted over the internet.

17 Claims, 2 Drawing Sheets

(51) Int. Cl.
*H04L 29/06* (2006.01)
*H04W 12/06* (2021.01)
*H04L 9/08* (2006.01)
*H04W 12/50* (2021.01)
*H04L 12/44* (2006.01)
*G06F 21/00* (2013.01)
*H04L 67/12* (2022.01)

(52) U.S. Cl.
CPC .......... *H04L 63/08* (2013.01); *H04L 63/0807* (2013.01); *H04L 63/0884* (2013.01); *H04W 4/70* (2018.02); *H04W 12/06* (2013.01); *H04W 12/50* (2021.01); *H04L 67/12* (2013.01); *H04L 2209/72* (2013.01)

(58) Field of Classification Search
CPC . H04L 63/0807; H04L 63/0884; H04L 67/12; H04L 9/0841; H04L 9/3247; H04W 12/06; H04W 4/70; H04W 12/003; H04W 12/084; H04W 12/50
See application file for complete search history.

(56) References Cited

U.S. PATENT DOCUMENTS

| | | | | |
|---|---|---|---|---|
| 2008/0292105 | A1* | 11/2008 | Wan | H04L 67/12 380/282 |
| 2009/0109874 | A1* | 4/2009 | Migault | H04L 63/0823 370/254 |
| 2009/0240941 | A1* | 9/2009 | Lee | H04L 9/006 713/169 |
| 2015/0097689 | A1* | 4/2015 | Logue | H04W 4/38 340/632 |
| 2015/0254463 | A1* | 9/2015 | Ryhorchuk | H04L 63/0442 713/156 |
| 2015/0256401 | A1* | 9/2015 | Zinger | H04L 41/14 370/401 |
| 2015/0281116 | A1* | 10/2015 | Ko | H04L 9/3242 713/171 |
| 2016/0080380 | A1* | 3/2016 | Dawoud Shenouda Dawoud | H04L 63/0876 713/156 |
| 2016/0094380 | A1* | 3/2016 | Enyedi | H04L 45/22 370/216 |
| 2016/0294828 | A1* | 10/2016 | Zakaria | H04L 63/0884 |
| 2016/0294829 | A1* | 10/2016 | Angus | H04L 9/085 |
| 2017/0063843 | A1* | 3/2017 | Vijayasankar | H04L 63/0442 |
| 2017/0251096 | A1* | 8/2017 | Koepke | H04M 1/72421 |

OTHER PUBLICATIONS

Mathur, Suhas, et al., Radio-telepathy: Extracting a Secret Key from an Unauthenticated Wireless Channel, MobiCom 2008, Proceedings of the 14th ACM international conference on Mobile computing and networking, pp. 128-139 , Sep. 14-19, 2008, San Francisco, ACM.
Maurer, Ueli M., Protocols for Secret Key Agreement by Public Discussion Based on Common Information, Advances in Cryptology—CRYPTO 1992, LNCS 740, pp. 461-470, 1993.
Maurer, Ueli M., Secret Key Agreement by Public Discussion from Common Information, IEEE Transactions on Information Theory, vol. 39, No. 3, pp. 733-742, May 1993.
Maurer, Ueli M., Information-Theoretically Secure Secret-Key Agreement by NOT Authenticated Public Discussion, Advances in Cryptology—EUROCRYPT '97, LNCS 1233, pp. 209-225, 1997.
Maurer, Ueli M., et al., Information-Theoretic Key Agreement: From Weak to Strong Secrecy for Free, Advances in Cryptology—EUROCRYPT 2000, LNCS 1807, pp. 351-368, 2000.
English Translation of Chinese Office Action corresponding to Chinese Patent Application No. 201780040101.3, dated Sep. 3, 2020 (9 pages).

* cited by examiner

SYSTEM AND METHOD FOR DELEGATING TICKET AUTHENTICATION TO A STAR NETWORK IN THE INTERNET OF THINGS AND SERVICES

CROSS-REFERENCE TO RELATED APPLICATION

This application is a 35 U.S.C. § 371 National Stage Application of PCT/EP2017/065950, filed on Jun. 28, 2017, which claims the benefit of U.S. Provisional Application No. 62/355,468, filed Jun. 28, 2016, the disclosures of which are herein incorporated by reference in their entirety.

FIELD

This disclosure relates generally to Internet of Things and Services and, more particularly, to system and method for delegating ticket authentication to star networks in the internet of things and services (IOTs).

BACKGROUND

Unless otherwise indicated herein, the materials described in this section are not prior art to the claims in this application and are not admitted to the prior art by inclusion in this section.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to a star topology network comprises a plurality of sensor nodes, each sensor node including an ID, a user device, and an internet-enabled central gateway in public-key cryptography communication with the user device, wherein the user device to generate a ticket by signing a message with a private key and encrypting the message with a public key of the central gateway after the ID is registered. The user device broadcast the ticket to the plurality of sensor nodes. The central gateway and the sensor nodes exchange a secret shared key after the sensor nodes receive the ticket. The sensor nodes generate a random number, encrypt the random number with shared key between the central device and the sensor nodes, and send a concatenation of the ticket and a message authentication code to the central gateway.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Figure 1:
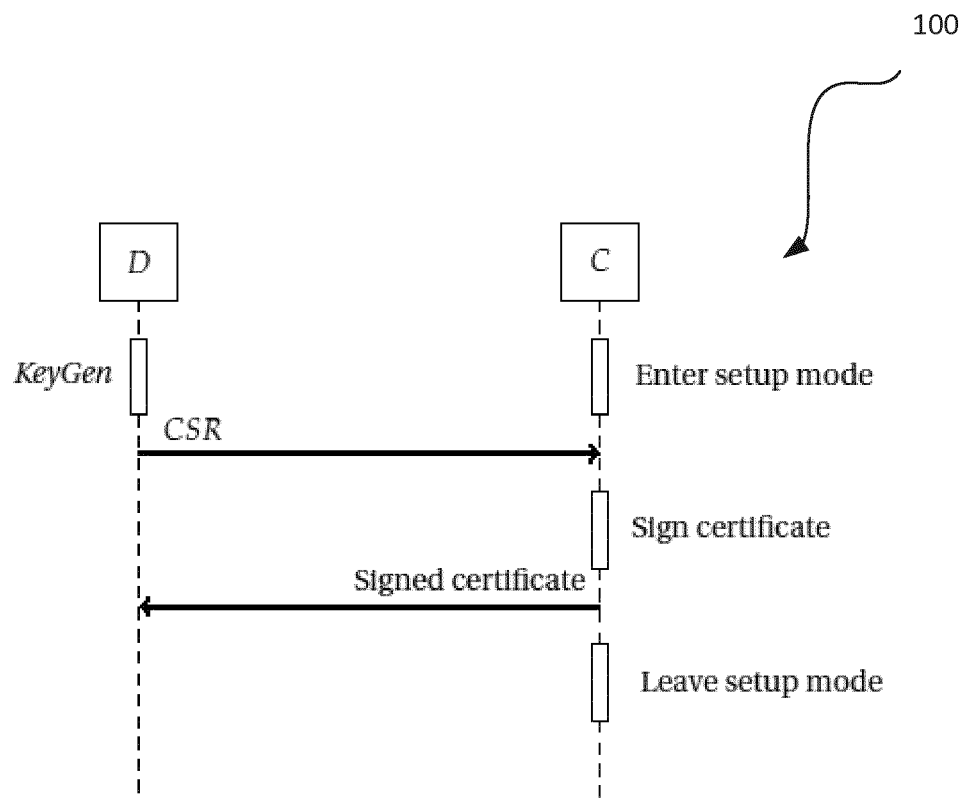
FIG. 1 is a flow diagram of a network comprising a user device and an internet-enabled central gateway.

FIG. 1 is a flow diagram illustrating a network 100 comprises a user device D and a central gateway C communicating with the user device D. During an initialization phase 100, both the user device D and the central gateway C generate an unique public-private key pairs. The user device D may be a thin client, a thick client, a mobile phone, a tablet, a phablet, a laptop, a personal digital assistant (PDA), a personal computer (PC), or any suitable electronic devices. The central gateway C is an internet-enabled central gateway. The user device D issues a Certificate Signing Request (CSR) and sends the CSR to the central gateway C. The CSR includes a public key of the user device D. The central gateway C upon receiving the request generates a certificate. The communication between the user device D and the central gateway C is secured either based on public-key cryptography, symmetric-key cryptography, or by the use of a secure channel such as a wired communication.

Figure 2:
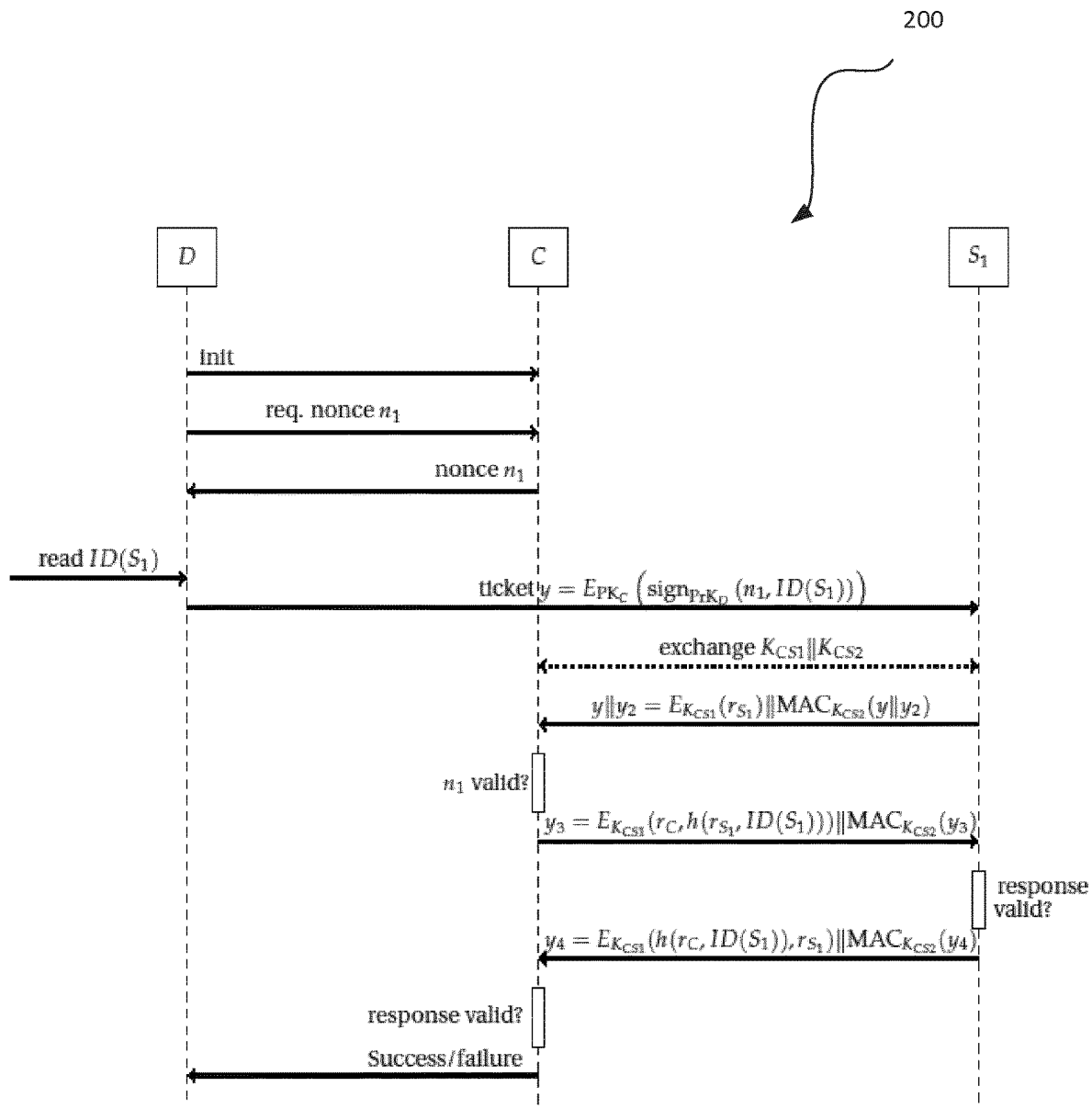
FIG. 2 is a flow diagraph of another network comprising a sensor node coupled to the user device and the internet-enabled central gateway.

FIG. 2 is a flow diagram illustrating a network 200 comprises a user device D, a central gateway C, and at least one new sensor node $S_1$ added to the existing network 200. Although one sensor node $S_1$ is illustrated, more than one sensor node may be added to the network 200. For instance, in a home automation, more than 10 sensor nodes are connected to the network 200 for a relatively long period of time between several months and several years. The sensor node $S_1$ may be actuators, sensing elements, or any suitable components that can connected to a star topology network. The initialization phase set up between the user device D and the central gateway C in FIG. 2 is similar to the initialization phase as illustrated in FIG. 1. In one embodiment, the user device D may be function as a ticket machine for emitting certified tickets which are personalized to individual sensor nodes. After the initialization phase is completed, the user device D sends a request for receiving a nonce $n_1$ to the central gateway C. In some embodiments, the user device D may send a request for receiving a timestamps instead of random nonces n. Upon receiving the request, the central device C checks if the request was issued by a legitimate device, e.g. the user device D. If the request is valid or authenticated, the central gateway C replies to the user device D with nonce $n_1$. Although one nonce $n_1$ is generated, the central gateway C may generate a set of nonce n and then set the set of nonce n to the user device D once a secure communication link becomes available. Afterwards, a secure communication between the user device D and the central gateway C is no longer required. Consequently, the user device D holds a set of already certified tickets for adding new nodes n to the network 200 at any time. After some individual amount of time, but below a chosen expiration of $n_1$, the user device D reads an ID of the node $S_1$ to be added to the network 200. In one embodiment, the ID can be read directly from the node $S_1$ via a secure communication interface. In some embodiments, the IDS can be read from the node $S_1$ by scanning a barcode or a Quick Response (QR) code located either on the node $S_1$ or on the node $S_1$ accessory such as owner's manual, packages, any materials accompanying with the node $S_1$ and so forth. In another embodiment, the user may receive the ID of the node $S_1$ over an internet when the node $S_1$ is purchased via an online store. In yet another embodiment, the sensor node with a specific ID can be added to an existing network wherein the ID is read off of a smart tag such as a RFID tag. In further yet another embodiment, the ID can be read from a Physically Unclonable Function (PUF) located on the sensor node. Once the ID of the node $S_1$ is registered, the user device D generates a ticket y by signing a message ($n_1$, ID($S_1$)) with its private key $PrK_D$ and encrypting it with C's public key $PK_C$. Thereafter, the user device D broadcasts the ticket y or sends the ticket y to $S_1$. After receiving y, the central gateway C and the node $S_1$ start the key agreement procedure to exchange a secret shared key $K_{CS}$= ($K_{CS1}$||$K_{CS2}$). The key agreement can be done either by a public-key cryptography such as Diffie-Hellman key exchange protocol or any suitable physical layer security.

After the shared key $K_{CS}$ has been exchanged between the node $S_1$ and the central gateway C, the node $S_1$ generates a random number $r_{S1}$. Subsequently, the node $S_1$ encrypts $r_{S1}$ with $K_{CS1}$ and sends a concatenation of y, $E_{KCS1}(r_{S1})$ and a message authentication code (MAC) to the central gateway C. Since the central gateway C can decrypt y, the central gateway C checks the validity of nonce $n_1$ and if the ticket has been signed by the trusted device D. If the central gateway C is a legitimate gateway, the central gateway C receives acknowledgement of ID($S_1$). Using the established key $K_{CS1}$, the central gateway C decrypts $y_2$ thereby obtaining the random number $r_{S1}$. Then, the central gateway C concatenates $r_{S1}$ and the ID of the node $S_1$ to be added to the existing network 200, i.e. ID($S_1$), and computes a hash h($r_{S1}$, ID($S_1$)) of the concatenated value. The central gateway C then generates a random number $r_C$, concatenates the random number $r_C$ with a hash value and sends the message $y_3=E_{KCS1}(r_{S1}(r_{S1},ID(S_1)))||MAC_{KCS2}$ ($y_3$) to the node $S_1$. Upon receiving the message $y_3$, node $S_1$ decrypts the message $y_3$, thereby obtaining the random number $r_C$ and the hash value h($r_{S1}$,ID($S_1$)). Since node $S_1$ knows the random number $r_{S1}$, node $S_1$ can compute the hash value and compare it to the received has value. If the values are identical, the response of the central gateway C to the challenge $r_{S1}$ is valid.

Next, the node $S_1$ takes the random number $r_C$ generated by the central gateway C and computes the hash h($r_c$,ID ($S_1$)). The node $S_1$ concatenates the hash value with the random number $r_{S1}$ and sends the message $y_3=E_k(r_C,h(r_c,ID(S_1)), r_{S1})||MAC_{KCS2}$ ($y_4$) to the central gateway C. Upon receiving the message, the central gateway C decrypts the message and verifies that the hash value h($r_c$,ID($S_1$)) returned by the node $S_1$ for the challenge re is equal to the hash value locally computed by the central gateway C. Finally, if the received and the computed hash values are identical, the central gateway C sends a message to the user device D indicating that the new node $S_1$ is successfully added to the network 200. In one embodiment, the time between the request to add a new sensor node $S_1$ to an existing network 200 and the start of the key agreement can be limited by an upper bound $t_{max}$ such that the new node $S_1$ can only be added within a small period of time.

In some embodiments, the hash function h can be replaced by some function $f$ that takes a random number and the Id of the node $S_1$ as an input. For instance, $f$ can be a function that takes an n-bit random number and the first half of an 2n-bit ID(S) and returns an XOR of these.

According to another aspect of the disclosure, if the communication between the user device D and the central gateway C is a symmetric-key cryptography, instead of signing the message with its private key, the user device D can calculate a MAC on the nonce n using a shared key between the user device D and the central gateway C, i.e. $K_{DC}$.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A star topology network comprising:
a plurality of sensor nodes, each sensor node in the plurality of sensor nodes having a respective ID;
a user device; and
an internet-enabled central gateway in public-key cryptographic communication with the user device,
wherein the user device is configured to:
read the respective ID from a first sensor node in the plurality of sensor nodes; and
generate a ticket by signing a first message with a private key and encrypting the first message with a public key of the central gateway, the first message including the respective ID of the first sensor node;
wherein the first sensor node is configured to: generate a first random number; encrypt the first random number with a secret shared key that was exchanged with the central gateway; and transmit, to the central gateway, a second message including a concatenation of the ticket, the encrypted first random number, and a message authentication code,
wherein the central gateway is configured to: decrypt the second message using the secret shared key that was exchanged with the first sensor node; and validate the ticket based on the decrypted second message, and
wherein the central gateway is configured to: recover the first random number from the decrypted second message; generate a second random number; determine a first hash of the first random number concatenated with the respective ID of the first sensor node; encrypt a concatenation of the second random number with the first hash; and transmit, to the first sensor node, a third message including a concatenation of (i) the encrypted concatenation of the second random number with the first hash and (ii) a message authentication code.

2. The star topology network of claim 1, wherein the user device is configured to:
broadcast the ticket to the plurality of sensor nodes.

3. The star topology network of claim 1, wherein the first sensor node is configured to:
exchange a secret shared key with the central gateway after receiving the ticket from the user device.

4. The start topology network of claim 1, wherein the first sensor device is configured to:
determine a second hash of the first random number concatenated with the respective ID of the first sensor node;
decrypt the third message using the secret shared key that was exchanged with the central gateway;
recover the second random number and the first hash from the decrypted third message; and
validate the third message by comparing the recovered first hash with the determined second hash.

5. The start topology network of claim 4, wherein the first sensor device is configured to:

determine a third hash of the second random number concatenated with the respective ID of the first sensor node;
encrypt a concatenation of the first random number with the third hash; and
transmit, to the central gateway, a fourth message including a concatenation of (i) the encrypted concatenation of the first random number with the third hash and (ii) a message authentication code.

6. The star topology network of claim 5, wherein the central gateway is configured to:
determine a fourth hash of the second random number concatenated with the respective ID of the first sensor node;
decrypt the fourth message using the secret shared key that was exchanged with the first sensor node;
recover the third hash from the decrypted fourth message; and
validate the fourth message by comparing the recovered third hash with the determined fourth hash.

7. The star topology network of claim 1, wherein the user device is configured to:
request a nonce from the central gateway; and
receive the nonce from the central gateway,
wherein the first message used to generate the ticket includes the nonce and the respective ID of the first sensor node.

8. A star topology network comprising:
a plurality of sensor nodes, each sensor node in the plurality of sensor nodes having a respective ID;
a user device; and
an internet-enabled central gateway in public-key cryptographic communication with the user device;
wherein the user device is configured to (i) read the respective ID from a first sensor node in the plurality of sensor nodes and (ii) generate a ticket by signing a first message with a private key and encrypting the first message with a public key of the central gateway, the first message including the respective ID of the first sensor node,
wherein the first sensor node is configured to (i) encrypt a first random number with a secret shared key that was exchanged with the central gateway and (ii) transmit, to the central gateway, a second message including a concatenation of the ticket and the encrypted first random number, and
wherein the central gateway is configured to (i) recover the first random number from the second message, (ii) determine a first hash of the first random number concatenated with the respective ID of the first sensor node, (iii) encrypt a concatenation of a second random number with the first hash, and (iv) transmit, to the first sensor node, a third message including the encrypted concatenation of the second random number with the first hash.

9. The star topology network of claim 8, wherein the user device is configured to:
broadcast the ticket to the plurality of sensor nodes.

10. The star topology network of claim 8, wherein the first sensor node is configured to:
exchange the secret shared key with the central gateway after receiving the ticket from the user device.

11. The start topology network of claim 8, wherein the first sensor node is configured to:
generate the first random number; and transmit, to the central gateway, the second message including a concatenation of the ticket, the encrypted first random number, and a message authentication code.

12. The star topology network of claim 8, wherein the central gateway is configured to:
   decrypt the second message using the secret shared key that was exchanged with the first sensor node; and
   validate the ticket based on the decrypted second message.

13. The star topology network of claim 8, wherein the central gateway is configured to:
   generate the second random number; and
   transmit, to the first sensor node, a third message including a concatenation of (i) the encrypted concatenation of the second random number with the first hash and (ii) a message authentication code.

14. The start topology network of claim 13, wherein the first sensor device is configured to:
   determine a second hash of the first random number concatenated with the respective ID of the first sensor node;
   decrypt the third message using the secret shared key that was exchanged with the central gateway;
   recover the second random number and the first hash from the decrypted third message; and
   validate the third message by comparing the recovered first hash with the determined second hash.

15. The start topology network of claim 14, wherein the first sensor device is configured to:
   determine a third hash of the second random number concatenated with the respective ID of the first sensor node;
   encrypt a concatenation of the first random number with the third hash; and
   transmit, to the central gateway, a fourth message including a concatenation of (i) the encrypted concatenation of the first random number with the third hash and (ii) a message authentication code.

16. The star topology network of claim 15, wherein the central gateway is configured to:
   determine a fourth hash of the second random number concatenated with the respective ID of the first sensor node;
   decrypt the fourth message using the secret shared key that was exchanged with the first sensor node;
   recover the third hash from the decrypted fourth message; and
   validate the fourth message by comparing the recovered third hash with the determined fourth hash.

17. The star topology network of claim 8, wherein the user device is configured to:
   request a nonce from the central gateway; and
   receive the nonce from the central gateway,
   wherein the first message used to generate the ticket includes the nonce and the respective ID of the first sensor node.

* * * * *

UNITED STATES PATENT AND TRADEMARK OFFICE
CERTIFICATE OF CORRECTION

PATENT NO. : 11,251,957 B2
APPLICATION NO. : 16/313221
DATED : February 15, 2022
INVENTOR(S) : Guajardo Merchan et al.

Page 1 of 1

It is certified that error appears in the above-identified patent and that said Letters Patent is hereby corrected as shown below:

In the Claims

In Claim 4, at Column 5, Line 55: "start topology" should read --star topology--.

In Claim 5, at Column 5, Line 66: "start topology" should read --star topology--.

In Claim 11, at Column 6, Line 66: "start topology" should read --star topology--.

In Claim 14, at Column 7, Line 17: "start topology" should read --star topology--.

In Claim 15, at Column 7, Line 28: "start topology" should read --star topology--.

Signed and Sealed this
Nineteenth Day of April, 2022

Katherine Kelly Vidal
*Director of the United States Patent and Trademark Office*